US012521826B2

(12) United States Patent
Liu et al.

(10) Patent No.: US 12,521,826 B2
(45) Date of Patent: Jan. 13, 2026

(54) ASSEMBLY DEVICE OF SEAL (71) Applicant: Illinois Tool Works Inc., Glenview, IL (US)

(72) Inventors: Zhixue Liu, Glenview, IL (US); De Wei, Glenview, IL (US); Yuexin Chen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 267 days.

(21) Appl. No.: 18/267,030

(22) PCT Filed: Jan. 26, 2022

(86) PCT No.: PCT/US2022/013840
§ 371 (c)(1),
(2) Date: Jun. 13, 2023

(87) PCT Pub. No.: WO2022/169646
PCT Pub. Date: Aug. 11, 2022

(65) Prior Publication Data
US 2024/0058908 A1 Feb. 22, 2024

(30) Foreign Application Priority Data

Feb. 5, 2021 (CN) .......................... 202110163096.3

(51) Int. Cl.
*B23P 19/08* (2006.01)
*B23K 3/06* (2006.01)
(52) U.S. Cl.
CPC ................ *B23P 19/08* (2013.01); *B23K 3/06* (2013.01)
(58) Field of Classification Search
CPC ... B23P 19/084; B23P 19/086; Y10T 29/4987
See application file for complete search history.

(56) References Cited

U.S. PATENT DOCUMENTS 2,086,371 A * 7/1937 Tear ...................... B23P 19/084
29/453
2,422,065 A * 6/1947 Anselmi ................ B29D 23/00
29/235
(Continued)

FOREIGN PATENT DOCUMENTS

CN  106271585 A    1/2017
CN  111634011 A *  9/2020  ............. B29C 65/56
(Continued)

OTHER PUBLICATIONS

KR-100887504-B1 including English Translation (Year: 2009).*
(Continued)

*Primary Examiner* — Jason L Vaughan
(74) *Attorney, Agent, or Firm* — Lando & Anastasi, LLP (57) ABSTRACT The present application discloses a fitting apparatus (100) for fitting a sealing member (110) onto a solder paste nozzle (230), the sealing member having a sealing member mounting hole (112), and the fitting apparatus comprising: a support plate (116); at least two first power sources (101, 102, 103, 104); at least two insertion members (121) and a second power source (105). By controlling the driving directions and driving sequence of multiple power sources, the fitting apparatus of the present application completes the work of expanding the sealing member mounting hole in a mechanical fashion; an operator then only needs to pass the base plate of the nozzle through the sealing member mounting hole in order to complete the fitting of the sealing member to the nozzle, so the operation is convenient and saves manpower.

10 Claims, 10 Drawing Sheets

(56) References Cited

U.S. PATENT DOCUMENTS

| | | | | |
|---|---|---|---|---|
| 4,782,573 | A * | 11/1988 | Le Floch | B25B 27/0028 |
| | | | | 29/235 |
| 5,315,746 | A * | 5/1994 | Machino | B25B 27/20 |
| | | | | 29/451 |
| 6,494,516 | B1 * | 12/2002 | Bertini | B25J 15/10 |
| | | | | 294/93 |
| 9,205,521 | B2 * | 12/2015 | Firsoff | B23P 19/084 |
| 2007/0271753 | A1 * | 11/2007 | Haag | B23B 31/16254 |
| | | | | 29/235 |
| 2009/0106966 | A1 * | 4/2009 | Muhlenbruck | A01K 85/00 |
| | | | | 29/428 |
| 2013/0298390 | A1 * | 11/2013 | Morita | B23P 19/04 |
| | | | | 29/700 |
| 2020/0108491 | A1 * | 4/2020 | Zhou | B23P 19/084 |

FOREIGN PATENT DOCUMENTS

| | | | | |
|---|---|---|---|---|
| CN | 211465111 | U | 9/2020 | |
| CN | 111936266 | A | 11/2020 | |
| EP | 1586410 | A1 | 10/2005 | |
| KR | 100887504 | B1 * | 3/2009 | B23P 19/02 |
| KR | 102094523 | B1 | 3/2020 | |
| WO | 2013088605 | A1 | 6/2013 | |

OTHER PUBLICATIONS

Notification of Transmittal of the International Search Report and the Written Opinion of the International Searching Authority from corresponding PCT/2022/013840 dated May 12, 2022.

\* cited by examiner

ASSEMBLY DEVICE OF SEAL

CROSS-REFERENCE TO RELATED APPLICATIONS

This application is a U.S. National Phase Application under 35 U.S.C. § 371 of International (PCT) Patent Application Serial No. PCT/US2022/013840, titled "ASSEMBLY DEVICE OF SEAL" filed on Jan. 26, 2021, which claims priority to Chinese Application Ser. No. 202110163096.3, titled "ASSEMBLY DEVICE OF SEAL" filed Feb. 5, 2021; the entire disclosure of each application is hereby incorporated herein by reference in its entirety for all purposes.

TECHNICAL FIELD

The present application relates to the field of solder paste nozzles, in particular to a fitting apparatus for a sealing member of a solder paste nozzle.

BACKGROUND ART

In a printed circuit board surface mount process, a solder paste printer (also called a stencil printer) is used to print solder paste onto an electronic product (such as a circuit board). The solder paste printer generally comprises a mesh plate (or stencil), a solder paste addition apparatus, a squeegee or scraper, and other mechanisms. During printing, the circuit board is automatically fed into the solder paste printer; the circuit board has a pattern of solder pads, or some other type of electrically conductive surfaces, on which solder paste can be deposited, and the circuit board is provided with one or more small holes or marks called reference points, for aligning the circuit board with the stencil in the solder paste printer before the solder paste is printed onto the circuit board. Once the circuit board has been aligned with the stencil in the printer, the squeegee or scraper is moved so that it skims over the stencil, in order to force the solder paste through holes in the stencil onto the circuit board, so as to distribute the solder paste. After the printing operation, the circuit board is sent to another workstation in the printed circuit board processing and production line.

The automatic solder paste addition apparatus on the solder paste printer is used to add canned or tubed solder paste to the stencil of the solder paste printer automatically, thereby replenishing the solder paste that is consumed in the printing process. A can of solder paste generally forms a solder paste can assembly together with a solder paste nozzle that is inserted into the solder paste can through an opening of the solder paste can, and solder paste is dispensed (or extruded) from the solder paste can through relative displacement of the solder paste can and the solder paste nozzle. A sealing member is generally fitted round the solder paste nozzle, the sealing member being used for sealing between the solder paste nozzle and the solder paste can. Solder paste has high viscosity, so after being used for a period of time, the sealing member may need to be replaced or cleaned.

SUMMARY OF THE INVENTION

In a first aspect, an objective of the present application is to provide a fitting apparatus for a sealing member, the fitting apparatus being used to fit the sealing member onto a solder paste nozzle, the sealing member having a sealing member mounting hole; the fitting apparatus comprises: a support plate, the support plate being configured to support the sealing member; at least two first power sources, the at least two first power sources being arranged around the support plate, and being configured to supply a linear driving force in a radial direction of the sealing member mounting hole; at least two insertion members, each of the at least two insertion members being connected to a respective one of the at least two first power sources and being driven thereby so as to be movable in a radial direction of the sealing member mounting hole, the at least two insertion members being configured to be insertable into the sealing member mounting hole of the sealing member and movable away from the center of the sealing member mounting hole, so as to increase a hole diameter of the sealing member mounting hole by pulling an edge of the sealing member mounting hole; and a second power source, the second power source being configured to be capable of driving the sealing member or the at least two first power sources to move in an axial direction of the sealing member mounting hole, so that the sealing member is movable in the axial direction of the sealing member mounting hole relative to the at least two insertion members, so that the at least two insertion members are able to be inserted into or withdrawn from the sealing member mounting hole of the sealing member.

Based on the above content, the support plate is connected to the second power source, so that the second power source is able to drive the sealing member via the support plate to move in the axial direction of the mounting hole.

Based on the above content, each of the at least two first power sources has a power output part, and the insertion member is connected to the power output part of the corresponding first power source.

Based on the above content, the first power source is a cylinder, and the power output part comprises a push rod capable of extending or retracting, the insertion member being connected to an end of the push rod.

Based on the above content, the power output part further comprises a connecting rod, and the insertion member is connected to the end of the push rod via the connecting rod.

Based on the above content, a positioning member is provided on the support plate, the positioning member being configured to position the sealing member.

Based on the above content, the at least two first power sources comprise four first power sources, the four first power sources being arranged evenly around the support plate.

Based on the above content, the fitting apparatus further comprises a detection apparatus, the detection apparatus being configured to detect whether the sealing member is supported on the support plate.

Based on the above content, the fitting apparatus further comprises a control apparatus, the control apparatus being configured to control the at least two first power sources to move synchronously in a radial direction of the mounting hole.

Based on the above content, the fitting apparatus further comprises a worktable, with the at least two first power sources, the second power source and the support plate being supported on the worktable.

DETAILED DESCRIPTION OF EMBODIMENTS

Various particular embodiments of the present application are described below with reference to the drawings, which form part of this specification. It should be understood that although terms indicating direction, such as "front", "rear", "up", "down", "left", "right", "top", "bottom", "inner" and "outer" are used in the present application to describe various exemplary structural parts and elements of the present application, these terms are used here solely to facilitate explanation, and determined on the basis of the exemplary orientations shown in the drawings. Since the embodiments disclosed in the present application may be arranged in different directions, these terms indicating direction are merely illustrative and should not be regarded as limiting.

Figure 1A:
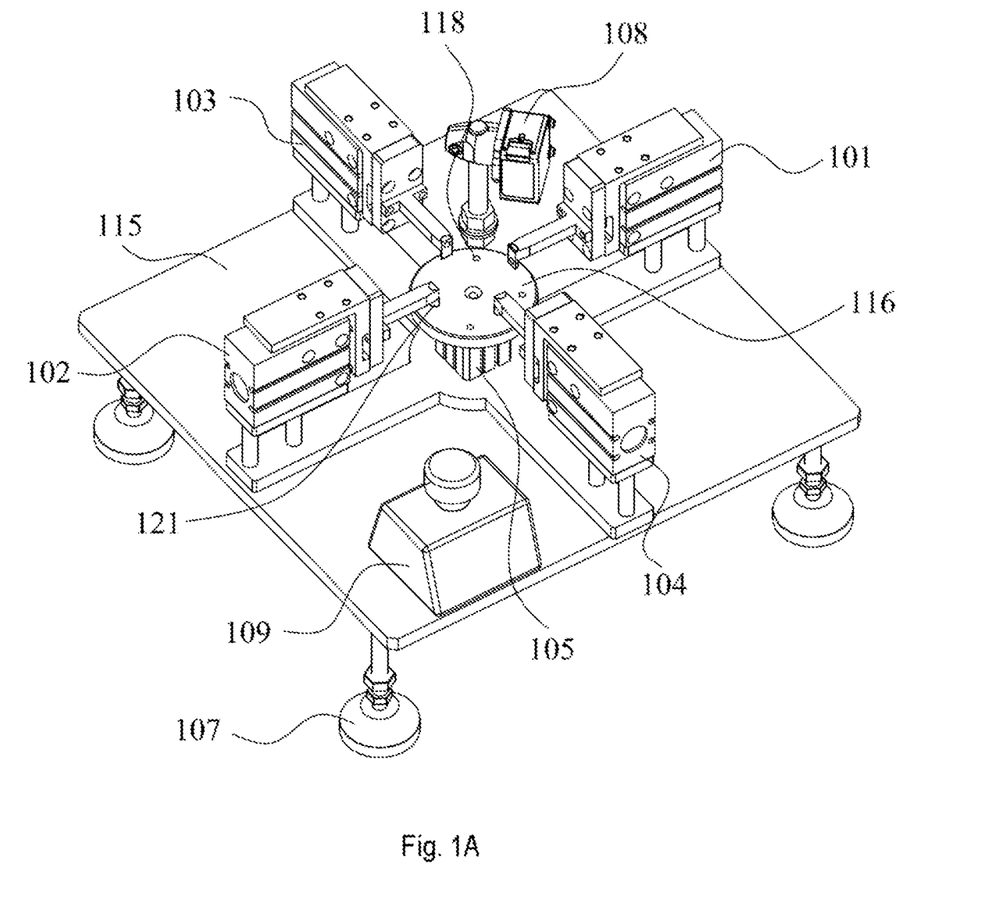
FIG. 1A is a three-dimensional structural drawing of the fitting apparatus according to an embodiment of the present application.
Figure 1B:
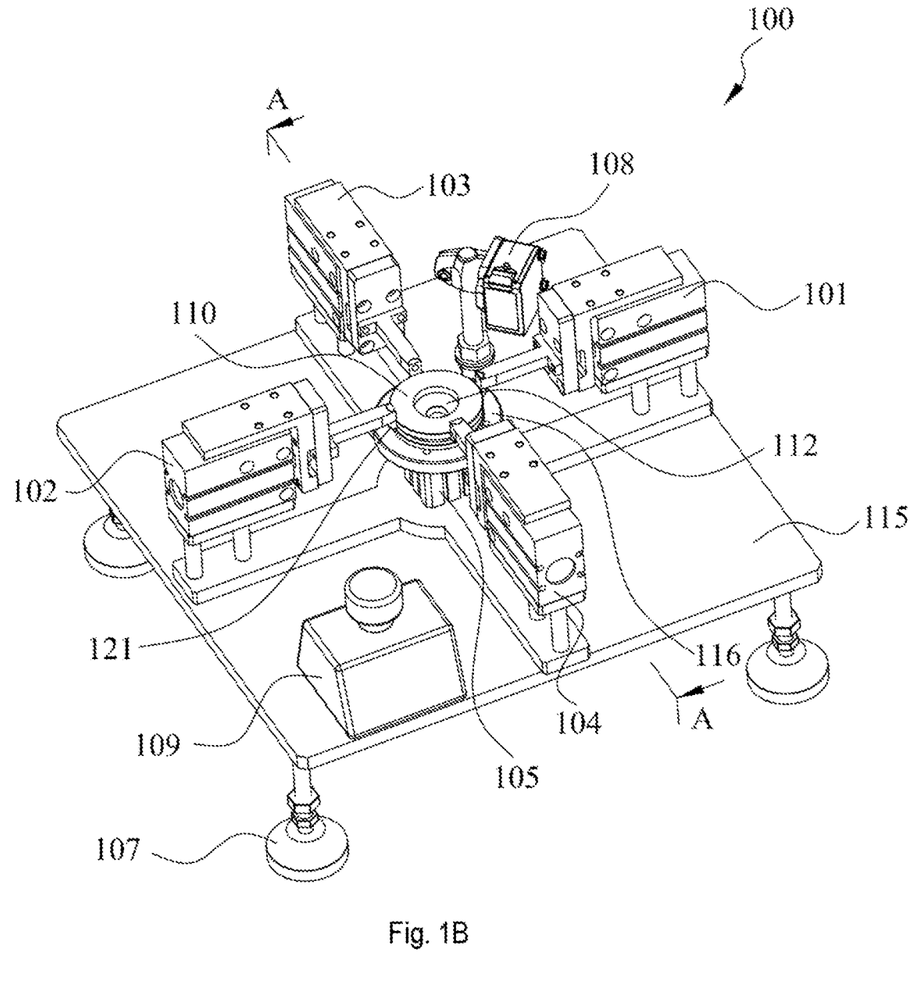
FIG. 1B is a three-dimensional structural drawing showing how a sealing member is fitted to the fitting apparatus in FIG. 1A.

FIGS. 1A and 1B show three-dimensional structural drawings of a fitting apparatus 100 according to an embodiment of the present application, wherein FIG. 1A does not include a sealing member 110, and is used for explaining the overall structure of the fitting apparatus 100. FIG. 1B includes the sealing member 110, and is used for explaining the cooperative relationship between the sealing member 110 and the fitting apparatus 100.

As shown in FIGS. 1A and 1B, the fitting apparatus 100 comprises a worktable 115 and a support plate 116; the worktable 115 is substantially square in shape, being supported by four support feet 107, and the support plate 116 is connected above the worktable 115. The sealing member 110 substantially has a round ring shape, and has a round sealing member mounting hole 112 at its center; the sealing member mounting hole 112 extends in an axial direction from top to bottom, so as to allow fitting round a nozzle 230 (see FIGS. 2A-2C) by means of the sealing member mounting hole 112. In this embodiment, multiple positioning members 118 are provided on the support plate 116, and the sealing member 110 is supported on the support plate 116 and positioned by the positioning members 118. In this embodiment, the support plate 116 is arranged substantially at a central position on the worktable 115. The fitting apparatus 100 is configured to increase a hole diameter of the sealing member mounting hole 112 by performing an operation on the sealing member 110, so as to facilitate the fitting of the sealing member mounting hole 112 round the nozzle 230.

Specifically, the fitting apparatus 100 further comprises at least two first power sources 101, 102, 103, 104 and a second power source 105, which are connected above the worktable 115. The number of first power sources is four; the four first power sources 101, 102, 103, 104 have the same structure, and are arranged evenly around the support plate 116 and connected to the worktable 115. The fitting apparatus 100 further comprises four insertion members 121, each insertion member 121 being connected to one first power source 101, 102, 103, 104, and being driven by the corresponding first power source 101, 102, 103, 104. Each insertion member 121 can be inserted into the sealing member mounting hole 112, and the first power source 101, 102, 103, 104 is used to supply to the insertion member 121 a linear driving force in a radial direction of the sealing member mounting hole 112, so that the insertion member 121 can move outward away from the center of the sealing member mounting hole 112, so as to increase the hole diameter of the sealing member mounting hole 112 by pulling an edge of the sealing member mounting hole 112.

There is a single second power source 105, which is connected to the worktable 115 at a position corresponding to the bottom of the support plate 116. The second power source 105 is used to supply to the support plate 116 a linear driving force in the axial direction of the sealing member mounting hole 112, so as to drive the support plate 116 to move up and down in the axial direction of the sealing member mounting hole 112, such that the sealing member 110 carried on the support plate 116 moves up and down in the axial direction of the sealing member mounting hole 112.

By setting the movement strokes of the first power sources 101, 102, 103, 104 and the second power source 105, and controlling the driving sequence and driving directions thereof, it is possible to cause the insertion members 121 to first align with the sealing member mounting hole 112 of the sealing member 110, and then be inserted into the sealing member mounting hole 112, and finally, the insertion members 121 pull the edge of the sealing member mounting hole 112 to increase the hole diameter of the sealing member mounting hole 112. Moreover, once the sealing member 110 has been fitted to the nozzle, the insertion members 121 can withdraw from the sealing member mounting hole 112, so that the hole diameter of the sealing member mounting hole 112 recovers.

As a particular example, the first power sources 101, 102, 103, 104 and the second power source 105 are all cylinders capable of supplying a linear driving force; in other examples, they may also be other power sources capable of supplying a linear driving force, such as electromagnetic driving mechanisms.

It must be explained that in other embodiments, the numbers of first power sources and insertion members 121 need not be set to four; all that is necessary is for them to be arranged evenly in the circumferential direction of the support plate 116 so as to supply an even force to the edge of the sealing member mounting hole 112. The second power source 105 also need not be arranged below the support plate 116 to drive the support plate 116 to move, but instead may be arranged below the first power source, and by driving each first power source to move, can also achieve the objective of causing the insertion member 121 to move relative to the sealing member 110 in the axial direction of the sealing member mounting hole 112. With such a configuration, the number of second power sources corresponds to the number of first power sources, so is also four.

The fitting apparatus 100 further comprises a control apparatus 109 and a detection apparatus 108, which are also arranged above the worktable 115. The control apparatus 109 is used to control the actions of the first power source and second power source; the detection apparatus 108 is used to detect whether the sealing member 110 is supported on the support plate 106. As an example, the detection apparatus 108 is a photoelectric sensor, and the control apparatus 109 can control the first power source and second power source automatically according to a set sequence, based on the result of detection by the detection apparatus 108. In some embodiments, the control apparatus 109 may also be controlled by hand, to control the actions of each power source manually.

Figure 2A:
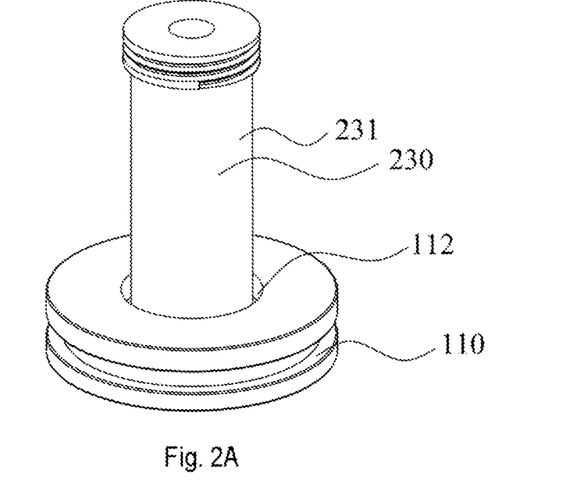
FIG. 2A is a three-dimensional structural drawing of a nozzle and a sealing member fitted together.
Figure 2B:
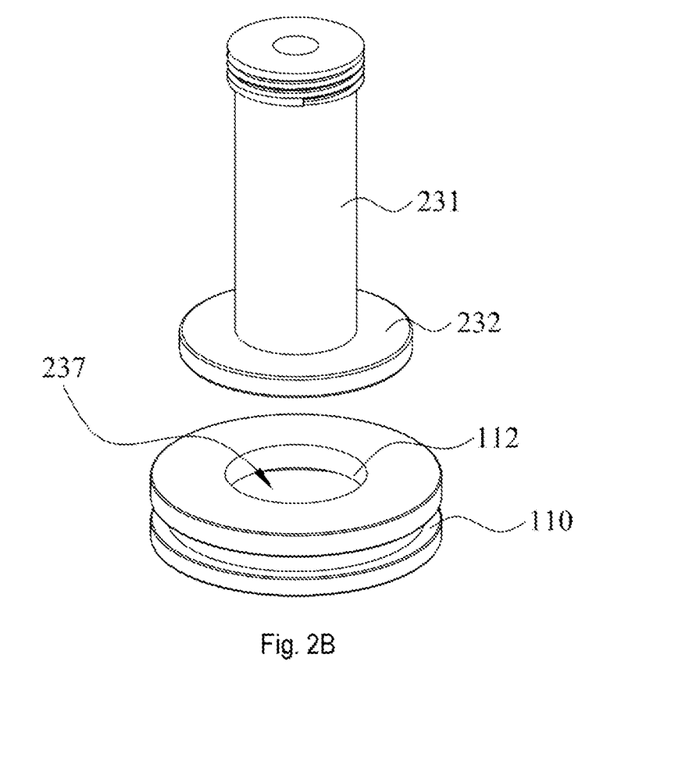
FIG. 2B is a partial exploded view of FIG. 2A.
Figure 2C:
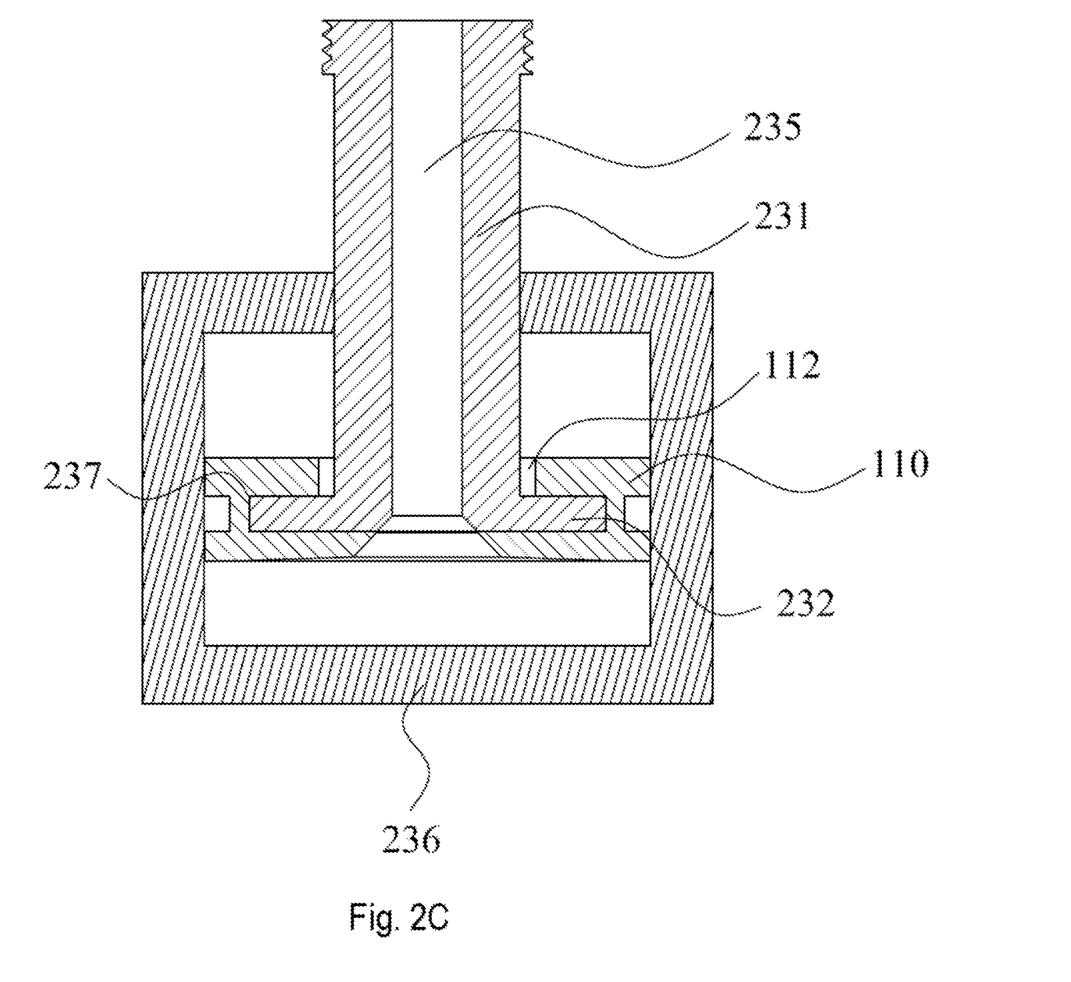
FIG. 2C is an axial sectional view of the nozzle in FIG. 2A when mounted in a solder paste can.

FIGS. 2A-2C show the specific structure of the mating of the nozzle with the sealing member, wherein FIG. 2A shows the three-dimensional structure of the nozzle with the sealing member 110 fitted round it, FIG. 2B shows an exploded drawing in which the nozzle and the sealing member are separated, and FIG. 2C shows an axial sectional view of the nozzle mounted in a solder paste can.

As shown in FIGS. 2A-2C, the nozzle 230 comprises a substantially cylindrical column body 231 and a base plate 232 connected to a bottom end of the column body 231, an outer diameter of the base plate 232 being larger than an outer diameter of the column body 231. The base plate 232 at the bottom end of the column body 231 is configured to be inserted into the interior of a solder paste can 236, while a top end of the column body 231 is configured to be connected to another part of a solder paste printer (not shown in the figures). Inside the nozzle 230 is a through-hole 235 which runs through the column body 231 and the base plate 232 from top to bottom.

Inside the sealing member 110 is a cavity 237, the cavity 237 being in communication with the sealing member mounting hole 112 above the cavity 237. The size of the cavity 237 is matched to the size of the base plate 232, while the size of the sealing member mounting hole 112 is matched to the size of the column body 231, so that the cavity 237 can accommodate the base plate 232, and the sealing member mounting hole 112 can accommodate the column body 231. Thus, the sealing member 110 can surround the base plate 232 and envelop the base plate 232. An outer diameter of the sealing member 110 is substantially the same as an inner diameter of the solder paste can 236, so that when the nozzle is mounted in the solder paste can 236, an outer side of the sealing member 110 can abut an inner wall of the solder paste can 236, thereby restricting the solder paste in the solder paste can 236 so that it can only flow out through the through-hole 235.

When the solder paste printer drives the nozzle 230 via the top end of the column body 231 to move up and down relative to the solder paste can 236, the motion of the nozzle 230 drives the base plate 232 and sealing member 110 to move in the solder paste can 236, and the solder paste in the solder paste can 236 is compressed and flows out of the top end of the column body 231 through the through-hole 235.

It must be explained that although the base plate 232 is positioned at an upper side of the column body 231 in the nozzle 230 shown in the figures, in the course of operation of a real solder paste printer, the nozzle 230 generally operates in an inverted orientation once the sealing member 110 has been fitted to the nozzle 230, i.e. the nozzle 230 is oriented in such a way that the base plate 232 is positioned at an upper side of the column body 231.

In the embodiment shown in the figures, the hole diameter of the sealing member mounting hole 112 is substantially the same as the outer diameter of the column body 231 and less than the outer diameter of the base plate 232, therefore when the base plate 232 moves inside the solder paste can 236, the sealing member 110 will not fall off the base plate 232. However, when the sealing member 110 is being fitted onto the nozzle 230, it is necessary to first stretch out the hole diameter of the sealing member mounting hole 112 until it is substantially the same as the outer diameter of the base plate 232, and only then can the base plate 232 be inserted into the cavity 237 of the sealing member 110 though the sealing member mounting hole 112.

Figure 3A:
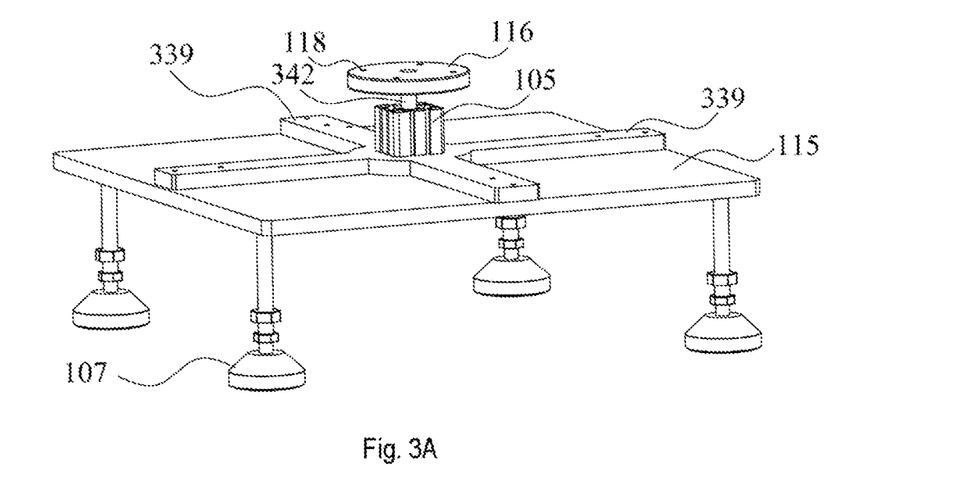
FIGS. 3A and 3B are three-dimensional structural drawings of the worktable in FIG. 1A at two angles.
Figure 3B:
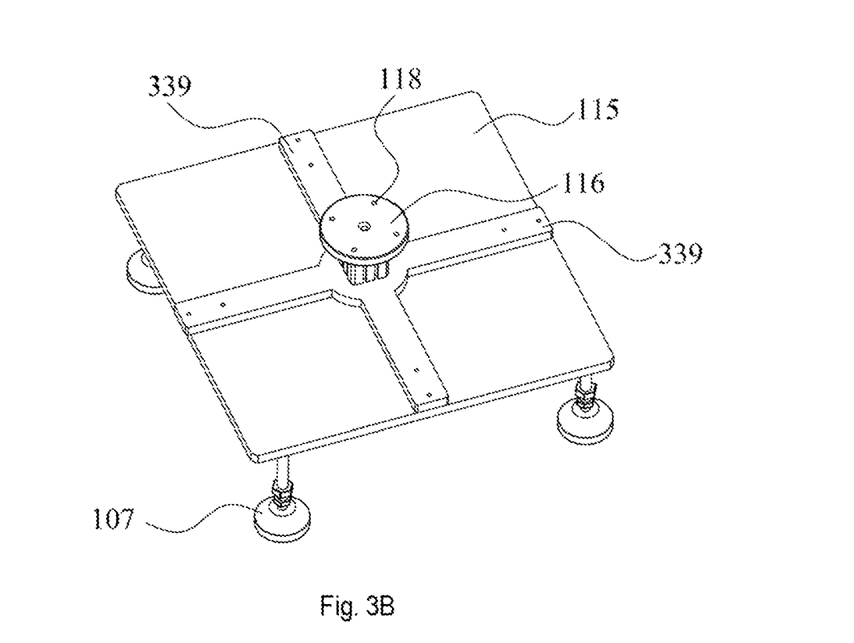

FIGS. 3A and 3B show three-dimensional structural drawings of the worktable 115 at two angles, in order to explain the specific structure of the worktable. As shown in FIGS. 3A and 3B, the worktable 115 is a square platform, with four support feet 107 being provided at four corners therebelow; the heights of the support feet 107 are the same, so that the worktable 115 is substantially level. In the embodiment shown in the figures, a cross-shaped fixing base 339 is connected in a fixed manner above the worktable 115, with the first power sources 101, 102, 103, 104 and the second power source 105 all being connected to the fixing base 339. As an example, the directions of extension of the cross-shaped fixing base 339 are substantially parallel to side edges of the square worktable 115. Of course, in some embodiments, the fixing base need not be provided; instead, the power sources are connected to the worktable 115 directly.

The second power source 105 is a cylinder, arranged at a central position on the fixing base 339. The second power source 105 has an extended state and a retracted state; a push rod 342 of the cylinder can extend upward or retract downward perpendicularly, such that the second power source 105 moves between the extended state and the retracted state. A top end of the push rod 342 is connected to the support plate 116, and the motion of the push rod 342 can drive the support plate 116 to move up and down perpendicularly. The support plate 116 is a horizontally arranged round shape, and four positioning members 118 are provided in the circumferential direction thereof. As a specific example, the positioning members 118 may be studs or screws, etc. which protrude slightly from an upper surface of the support plate 116, and the sealing member 110 is positioned by being blocked between the positioning members 118.

Figure 4A:
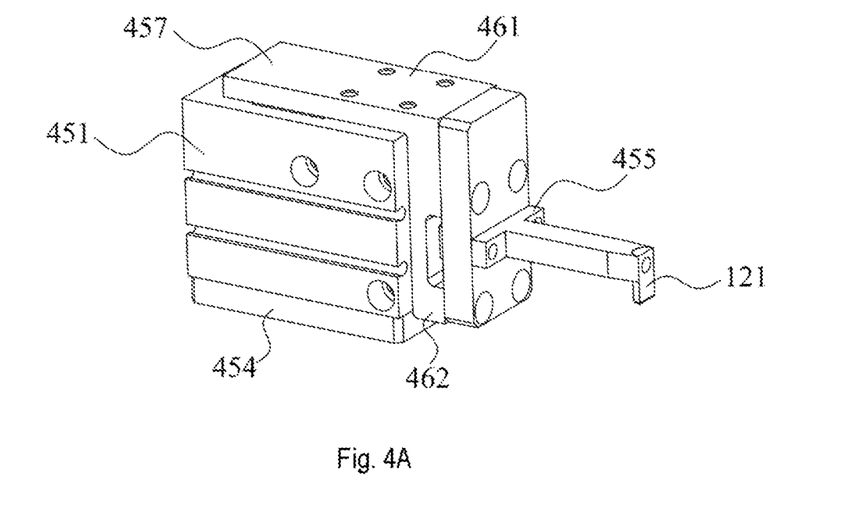
FIG. 4A is a three-dimensional structural drawing of the first power source in FIG. 1A.
Figure 4B:
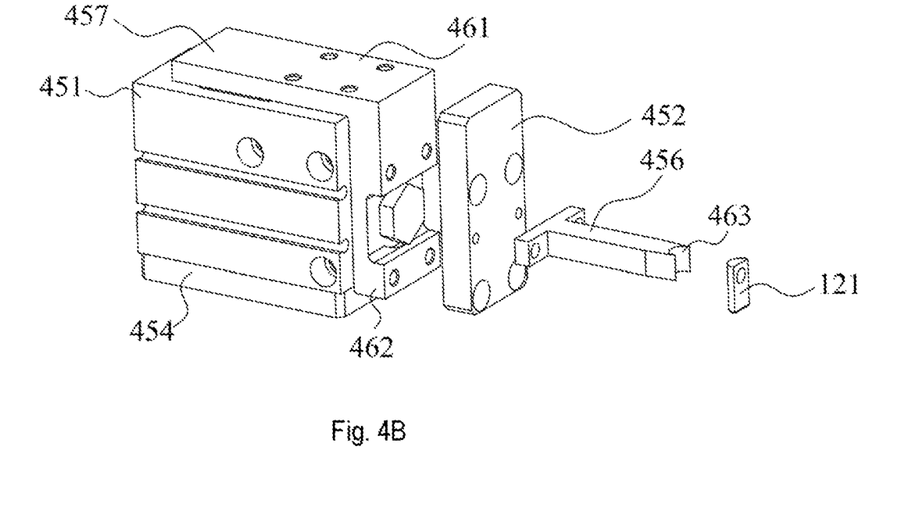
FIG. 4B is an exploded structural drawing of the first power source in FIG. 4A.
Figure 4C:
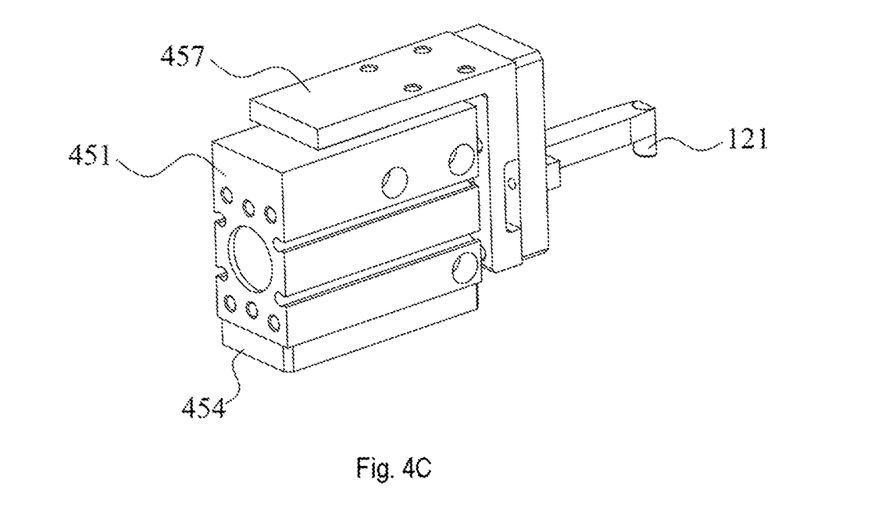
FIGS. 4C and 4D are three-dimensional structural drawings of the first power source in FIG. 4A in two states.
Figure 4D:
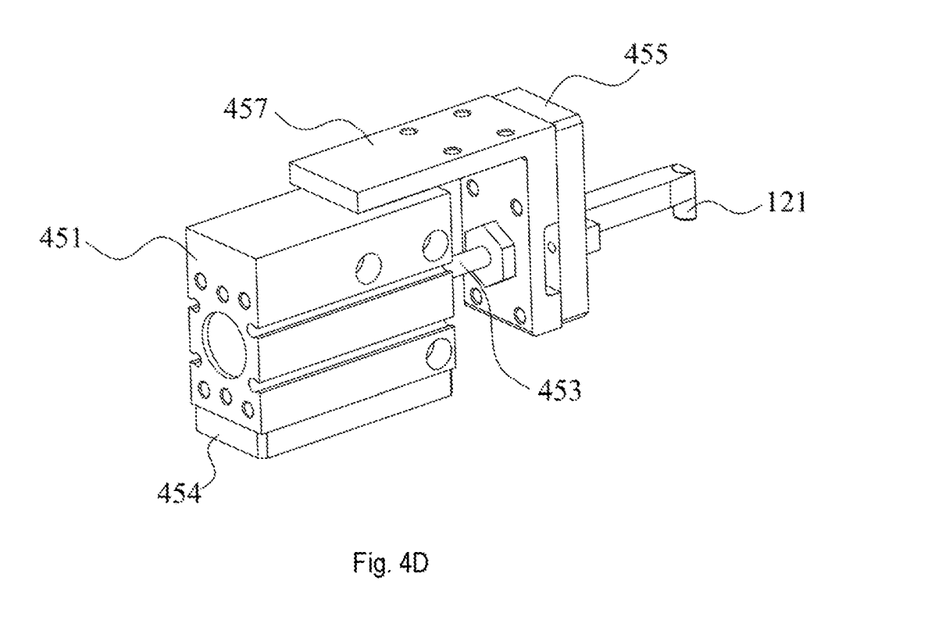

FIGS. 4A-4D show the specific structure of the first power source, wherein FIG. 4A shows a three-dimensional drawing of the first power source, FIG. 4B is an exploded view of FIG. 4A, FIG. 4C shows a three-dimensional drawing of the first power source in a retracted state, and FIG. 4D shows a three-dimensional drawing of the first power source in an extended state. Since each first power source has the same structure, one of the first power sources is taken as an example below and described in detail.

As shown in FIGS. 4A-4D, the first power source is a cylinder 451, comprising a cylinder body 454 and a power output part 455; the insertion member 121 is connected to the power output part 455, and the cylinder 451 supplies a driving force to the insertion member 121 via the power output part 455, in order to drive the insertion member 121 to move forward and backward.

Specifically, the power output part 455 comprises a push rod 453, a slider 457, a fixing base 452 and a connecting rod 456. The push rod 453 can extend or retract horizontally relative to the cylinder body 454, in order to supply the driving force. The slider 457 is L-shaped; a horizontal part 461 thereof is located above the cylinder body 454, and a slide rail (not shown in the figures) extending in the direction of motion of the push rod 453 may be provided between the horizontal part 461 and the cylinder body 454. A vertical part 462 of the slider 457 is located at a front side of the cylinder body 454, and a rear side of the vertical part 462 is connected to the push rod 453. Thus, the slider 457 can be pushed by the push rod 453 so as to slide forward and backward relative to the cylinder body 454 stably. The fixing base 452 and connecting rod 456 are connected at a front side of the vertical part 462 of the slider 457, and the insertion member 121 is connected to a front end of the connecting rod 456; the insertion member 121 moves as the slider 457, the fixing base 452 and the connecting rod 456 move. Thus, the cylinder 451 can supply the driving force to the insertion member 121 via the power output part 455, enabling the insertion member 121 to move forward and backward.

In this embodiment, the insertion member 121 is configured to be inserted into the sealing member mounting hole 112 of the sealing member 110; therefore, a rear side surface of the insertion member 121 that is configured to come into contact with the sealing member mounting hole 112 is matched in shape to the sealing member mounting hole 112, for example having the shape of part of a cylinder. A groove 463 matched in shape to the rear side surface of the insertion member 121 is provided at the front end of the connecting rod 456; an upper part of the insertion member 121 is connected to the groove 463, and a lower part of the insertion member 121 is configured to be inserted into the sealing member mounting hole 112. It must be explained that the length of the insertion member 121 and the movement stroke of the second power source 105 should be set such that when the second power source 105 moves to the extended state, the insertion member 121 can come into contact with the outer side of the sealing member 110 or be inserted into the sealing member mounting hole 112, and when the second power source 105 moves to the retracted state, the sealing member 110 will not be blocked by the insertion member 121.

When the cylinder 451 is in the retracted state as shown in FIG. 4C, the sealing member 110 can be supported on the support plate 116 in a positioned fashion. When the cylinder 451 is in the extended state as shown in FIG. 4D, the insertion member 121 can be inserted into the sealing member mounting hole 112 of the sealing member 110. When the cylinder 451 moves back to the retracted state shown in FIG. 4C from the extended state shown in FIG. 4D, the insertion member 121 can pull the edge of the sealing member mounting hole 112, such that the hole diameter of the sealing member mounting hole 112 increases until the base plate 232 of the nozzle 230 can be inserted into the cavity 237 of the sealing member 110.

Figure 5:
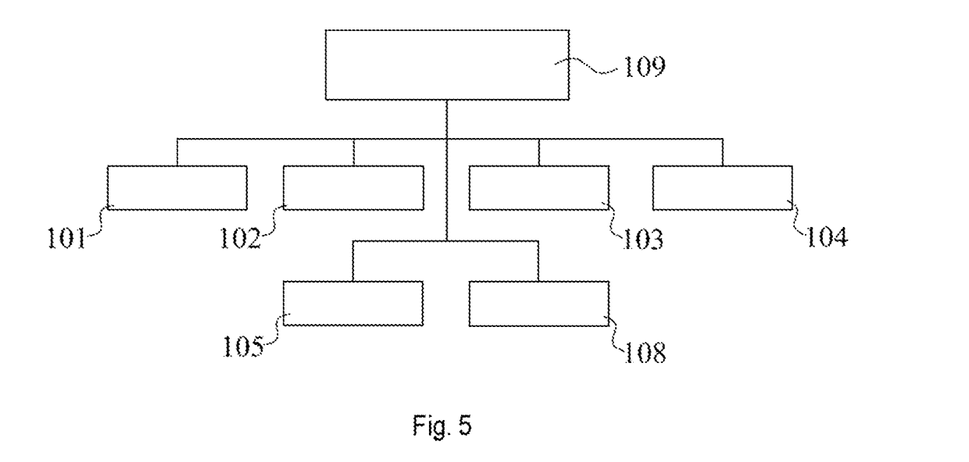
FIG. 5 is a schematic diagram of the control structure of the fitting apparatus in FIG. 1A.

FIG. 5 shows the control structure of the control apparatus 109. As shown in FIG. 5, the control apparatus 109 is communicatively connected to the first power sources 101, 102, 103, 104, so that the control apparatus 109 can control the first power sources 101, 102, 103, 104 to move synchronously between the extended state and the retracted state. The control apparatus 109 is also communicatively connected to the second power source 105, in order to control the movement sequence of the first power sources 101, 102, 103, 104 and the second power source 105. As an example, the control apparatus 109 is also communicatively connected to the detection apparatus 108, in order to receive the detection result of the detection apparatus 108, and automatically control the actions of the first power sources 101, 102, 103, 104 and the second power source 105 based on the detection result. In other embodiments, the control apparatus 109 need not receive the detection result of the detection apparatus 108; instead, the actions of the first power sources 101, 102, 103, 104 and the second power source 105 are controlled manually by an operator, so as to complete the process of fitting the sealing member 110.

FIGS. 6A-6E show sectional views of the fitting apparatus 100 and the sealing member 110 in the direction of the section line A-A in FIG. 2A, in the process of fitting the sealing member 110 onto the nozzle 230 on the fitting apparatus 100.

Figure 6A:
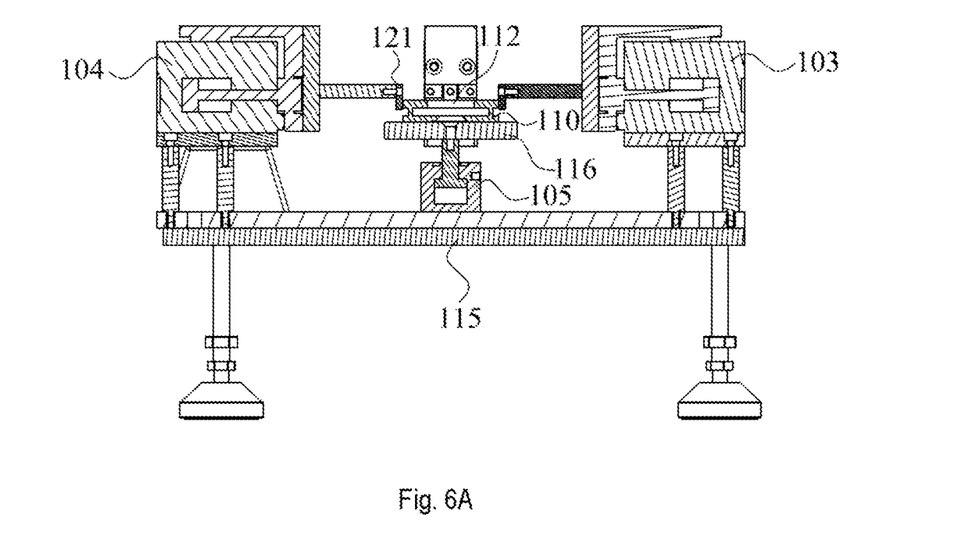
FIGS. 6A-6E are drawings showing the process of the sealing member being fitted onto the nozzle by the fitting apparatus in FIG. 1A.

As shown in FIG. 6A, the second power source 105 is in the extended state, and the first power sources 101, 102, 103, 104 are in the retracted state. At this time, the operator can place the sealing member 110 at a central position on the support plate 116. The insertion members 121 abut an outside edge of the sealing member 110, having not yet been inserted into the sealing member mounting hole 112. The second power source 105 then moves downward to the state shown in FIG. 6B.

Figure 6B:
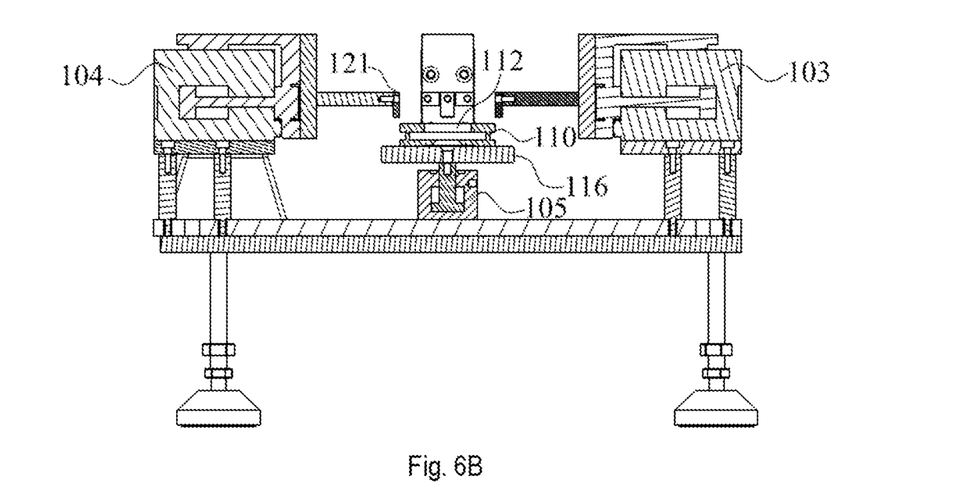

As shown in FIG. 6B, the second power source 105 is in the retracted state, and the first power sources 101, 102, 103, 104 are still in the retracted state. At this time, the insertion members 121 no longer abut the outside edge of the sealing member 110, being located above the sealing member 110. The first power sources 101, 102, 103, 104 then extend inward to the state shown in FIG. 6C.

Figure 6C:
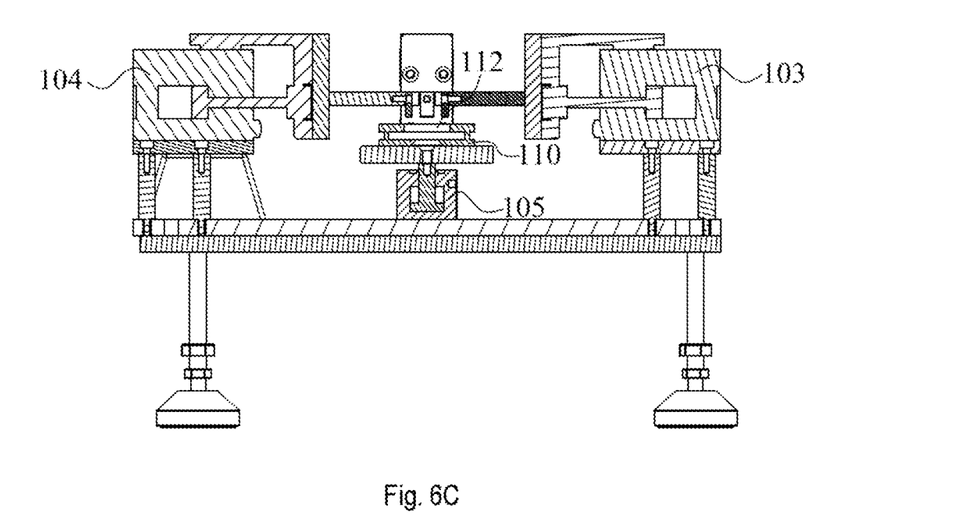

As shown in FIG. 6C, the second power source 105 is still in the retracted state, and the first power sources 101, 102, 103, 104 are in the extended state. At this time, the insertion members 121 have still not been inserted into the sealing member mounting hole 112, being located directly above the sealing member mounting hole 112. The second power source 105 then extends upward to the state shown in FIG. 6D.

Figure 6D:
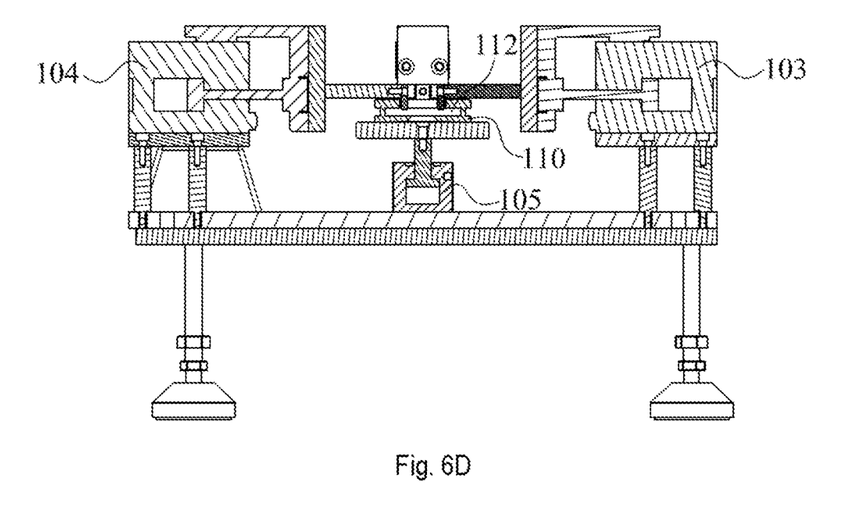

As shown in FIG. 6D, the second power source 105 is in the extended state, and the first power sources 101, 102, 103, 104 are still in the extended state. At this time, the insertion members 121 are inserted into the sealing member mounting hole 112, and abut the edge of the sealing member mounting hole 112. The first power sources 101, 102, 103, 104 then retract inward to the state shown in FIG. 6E.

Figure 6E:
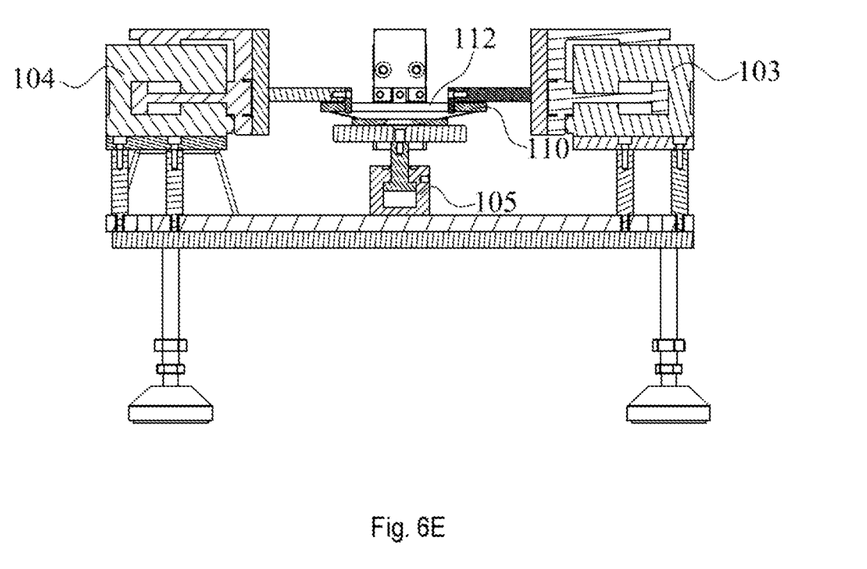

As shown in FIG. 6E, the second power source 105 is still in the extended state, and the first power sources 101, 102, 103, 104 are in the retracted state. At this time, the insertion members 121 pull the edge of the sealing member mounting hole 112 to move together, such that the sealing member mounting hole 112 is stretched out so as to increase the hole diameter; when the hole diameter has increased to substantially the same size as the cavity 237, the nozzle 230 can be inserted directly into the sealing member 110 in a downward direction, with the base plate 232 being accommodated in the cavity 237.

When fitting is complete, the second power source 105 retracts downward, such that the insertion members 121 withdraw from the sealing member mounting hole 112. Thus, the sealing member mounting hole 112 can return to its initial size, being substantially matched in size to the outer diameter of the column body 231 of the nozzle 230.

The sealing member 110 in the present application can envelop the base plate 232 of the nozzle 230. When the base plate 232 of the nozzle 230 moves in the solder paste can 236, the solder paste in the solder paste can 236 is located below the sealing member 110, and thus will not contaminate the nozzle 230; all that need be done is to periodically clean or replace the sealing member 110.

However, for the sealing member 110 to envelop the base plate 232 of the nozzle 230, it is necessary to make the size of the sealing member mounting hole 112 smaller than that of the cavity 237; consequently, in order to fit the sealing member 110 to the nozzle 230, it is necessary to first expand the size of the sealing member mounting hole 112 manually until it is able to accommodate the passage of the base plate 232 therethrough, but this is a difficult operation, with a high labor cost.

By controlling the driving directions and driving sequence of multiple power sources, the fitting apparatus of the present application completes the work of expanding the sealing member mounting hole 112 in a mechanical fashion; the operator then only needs to pass the base plate of the nozzle through the sealing member mounting hole in order to complete the fitting of the sealing member to the nozzle, so the operation is convenient and saves manpower.

Although the present application is described with reference to the particular embodiments shown in the drawings, it should be understood that the fitting apparatus of the present application may have many variant forms without departing from the spirit, scope and background of the teaching of the present application. Those skilled in the art will also realize that the structures in the embodiments disclosed in the present application can be changed in different ways, all of which fall within the spirit and scope of the present application and claims.

The invention claimed is:

1. A fitting apparatus for a sealing member, the fitting apparatus (100) being used to fit the sealing member (110) onto a solder paste nozzle (230), the sealing member (110) having a sealing member mounting hole (112), characterized in that the fitting apparatus comprises:
   a support plate (116), the support plate (116) being configured to support the sealing member (110);
   at least two first power sources (101, 102, 103, 104), the at least two first power sources (101, 102) being arranged around the support plate (116), and being configured to supply a linear driving force in a radial direction of the sealing member mounting hole (112);
   at least two insertion members (121), each of the at least two insertion members (121) being connected to a respective one of the at least two first power sources (101, 102) and being driven thereby so as to be movable in a radial direction of the sealing member mounting hole (112), the at least two insertion members (121) being configured to be insertable into the sealing member mounting hole (112) of the sealing member (110) and movable away from the center of the sealing member mounting hole (112), so as to increase a hole diameter of the sealing member mounting hole (112) by pulling an edge of the sealing member mounting hole (112);
   a second power source (105), the second power source (105) being configured to be capable of driving the sealing member (110) or the at least two first power sources (101, 102, 103, 104) to move in an axial direction of the sealing member mounting hole (112), so that the sealing member (110) is movable in the axial direction of the sealing member mounting hole (112) relative to the at least two insertion members (121), so that the at least two insertion members (121) are able to be inserted into or withdrawn from the sealing member mounting hole (112) of the sealing member (110); and
   a detection apparatus configured to detect whether the sealing member is supported on the support plate; and
   a control apparatus coupled to the at least two first power sources, the second power source and the detection apparatus, the control apparatus being configured to receive detection results from the detection apparatus and to automatically control the at least two first power sources and the second power source based on the detection results, the control apparatus further being configured to control the at least two first power sources to move synchronously the at least two insertion members between an extended state and an retracted state.

2. The fitting apparatus as claimed in claim 1, characterized in that:
   the support plate (116) is connected to the second power source (105), so that the second power source (105) is able to drive the sealing member (110) via the support plate (116) to move in the axial direction of the mounting hole (112).

3. The fitting apparatus as claimed in claim 1, characterized in that:
   each of the at least two first power sources (101, 102, 103, 104) has a power output part (455), and the insertion member (121) is connected to the power output part (455) of the corresponding first power source (101, 102, 103, 104).

4. The fitting apparatus as claimed in claim 3, characterized in that:
   the first power source (101, 102, 103, 104) is a cylinder (451), and the power output part (455) comprises a push rod (453) capable of extending or retracting, the insertion member (121) being connected to an end of the push rod (453).

5. The fitting apparatus as claimed in claim 4, characterized in that:
   the power output part (455) further comprises a connecting rod (456), and the insertion member (121) is connected to the end of the push rod (453) via the connecting rod (456).

6. The fitting apparatus as claimed in claim 1, characterized in that:
   a positioning member (118) is provided on the support plate (116), the positioning member (118) being configured to position the sealing member (110).

7. The fitting apparatus as claimed in claim 1, characterized in that:
   the at least two first power sources (101, 102, 103, 104) comprise four first power sources (101, 102, 103, 104), the four first power sources (101, 102, 103, 104) being arranged evenly around the support plate (116).

8. The fitting apparatus as claimed in claim 1, characterized in that:
   the fitting apparatus (100) further comprises a detection apparatus (108), the detection apparatus (108) being configured to detect whether the sealing member (110) is supported on the support plate (106).

9. The fitting apparatus as claimed in claim 1, characterized in that:
   the fitting apparatus (100) further comprises a control apparatus (109), the control apparatus (109) being configured to control the at least two first power sources (101, 102, 103, 104) to move synchronously in a radial direction of the mounting hole (112).

10. The fitting apparatus as claimed in claim 1, characterized in that:
    the fitting apparatus (100) further comprises a worktable (115), with the at least two first power sources (101, 102, 103, 104), the second power source (105) and the support plate (116) being supported on the worktable (115).

* * * * *